United States Patent [19]

Giebeler

[11] 4,407,533

[45] Oct. 4, 1983

[54] HIGH PRESSURE SWIVEL JOINT

[75] Inventor: James F. Giebeler, San Bernardino, Calif.

[73] Assignee: Arrowhead Continental, San Bernardino, Calif.

[21] Appl. No.: 307,441

[22] Filed: Oct. 1, 1981

[51] Int. Cl.³ .............. F16L 27/00; F16L 17/00; F16L 23/00; F16L 21/00

[52] U.S. Cl. .................... 285/281; 285/365; 285/373; 285/407; 285/419; 285/349; 285/351; 285/93

[58] Field of Search .............. 285/276, 280, 281, 364, 285/365, 373, 406, 407, 419, 349, 351, 93, 321

[56] References Cited

U.S. PATENT DOCUMENTS

| | | | |
|---|---|---|---|
| 3,052,491 | 9/1962 | Grass | 285/364 X |
| 3,058,761 | 10/1962 | Christophersen | 285/281 |
| 3,317,220 | 5/1967 | Bruning | 285/276 X |
| 3,479,065 | 11/1969 | Bahlke et al. | 285/276 X |
| 3,507,520 | 4/1970 | Guldener et al. | 285/364 X |

Primary Examiner—Richard J. Scanlan, Jr.
Attorney, Agent, or Firm—Lyon & Lyon

[57] ABSTRACT

A device for connecting two pipes for carrying abrasive material under high pressure employs a flange member welded to an end of one of the pipes and a ring member welded to an end of the other pipe. The pipes and both members have the same internal diameter. One or both pipes may be cold formed into a curved shape. An outward-extending rib on the ring member and a shoulder on the flange member are encircled by a tension sleeve having an inwardly directed lip at each end. The tension sleeve comprises two semi-circular halves. One or more continuous circumferential bands encircle the tension sleeve to hold the two halves together against radial separation. An anti-friction bearing assembly between one of said lips and a shoulder on the ring member permits relative turning movement between said pipes. An axial projection on the ring member is received within a recess in the flange member, and seal means are provided between the projection and the recess.

6 Claims, 3 Drawing Figures

HIGH PRESSURE SWIVEL JOINT

This invention relates to swivel joints for connecting pipes carrying abrasive materials at high pressures and high flow rates. Devices of this type are used in connection with the completion of oil wells in various operations known as fracturing, stimulation, treating, and squeeze cementing. Internal erosion of the pipes and swivel joints connecting them is severe, and it is highly desirable to be able to check for excessive erosion and consequent danger of failure by weighing pipe sections and attached parts of swivel joints after a period of use. Excessive loss in weight requires replacement of worn parts. However, in order to use a weighing scale as a check on continued serviceability, it is necessary to have minimum variation in the hardness of the pipes and connecting parts of the swivel joints, because hardness variations cause variation in erosion rates.

Typically, high pressure high volume piping systems for this purpose extend from one or more high pressure piston pumps located on trucks near the well head, and a series of pipes and swivel joints convey large volumes of abrasive material at very high pressure to a specially adapted well head structure. Many of the pipes are curved to provide a universal type movement between the pumps and the well head. The delivery of high pressure material from the pumps occurs with heavy pulsations which cause the pipe sections to have relative turning movement at the swivel joints, and the piping sections move in periodic fashion in accordance with the pulsation of the pumps.

It is also desirable that the anti-friction bearings which permit relative turning movement of adjacent pipes contain elements which operate in compression, and not in shear. When thrust bearings with balls or roller elements are required to operate in shear, experience has shown that the service life is materially shortened.

Other and more detailed objects and advantages will appear hereinafter:

Figure 1:
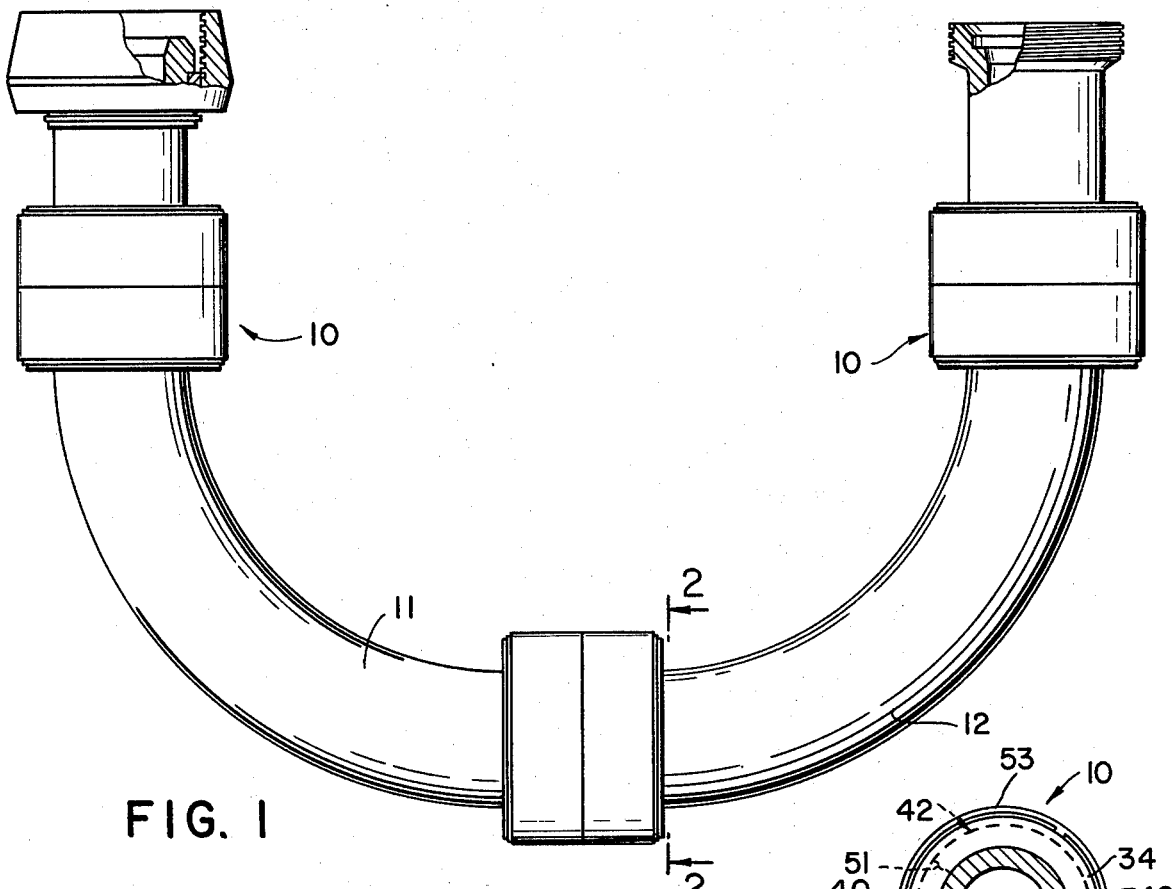
FIG. 1 is a side elevation partly in section, showing a preferred embodiment of this invention.

Referring to the drawings, the swivel joint generally designated 10 serves to connect two pipes, one or both of which are cruved or straight. The pipes all have the same inside diameter 13, outside diameter 14, and wall thickness 15. The curved pipes are cold-formed from straight pipes using a heavy die with a curved cavity on one side and a grooved roller on the other side, not shown.

Before or after the cold-forming process, a flange member 16 is welded at 17 by a spin-welding process to one end of the pipe 11. This flange member has a bore 18 which is the same diameter as the inside diameter of the pipe 11 and has a circular surface 19 which is the same diameter as the outside diameter of the pipe 11. The outer cylindrical circumference 21 of the flange member 16 is joined to the circular surface 19 by the radial shoulder 22, and the projecting end of the flange member 16 terminates in a radial wall 23.

A ring member 24 is welded by the same spin-welding process to one end of the curved pipe 12. The bore 25 is the same diameter as the bore 18 and the inside diameters of the pipes 11 and 12. The outer cylindrical surface 26 of the ring member 24 has the same diameter as the outside diameter 14 of the curved pipe 12. An annular rib 27 formed integrally with the ring member 24 has a face 28 which abuts the radial wall 23 on the flange member 16. The ring member 24 also has a projecting portion 29 which extends axially into a recess 31 in the projecting end of the flange member 16. A radial shoulder 32 on the annular rib 27 joins the outer cylindrical surface 33 with the cylindrical surface 26.

Figure 2:
FIG. 2 is a sectional view taken substantially on the lines 2—2 as shown on FIG. 1.
Figure 3:
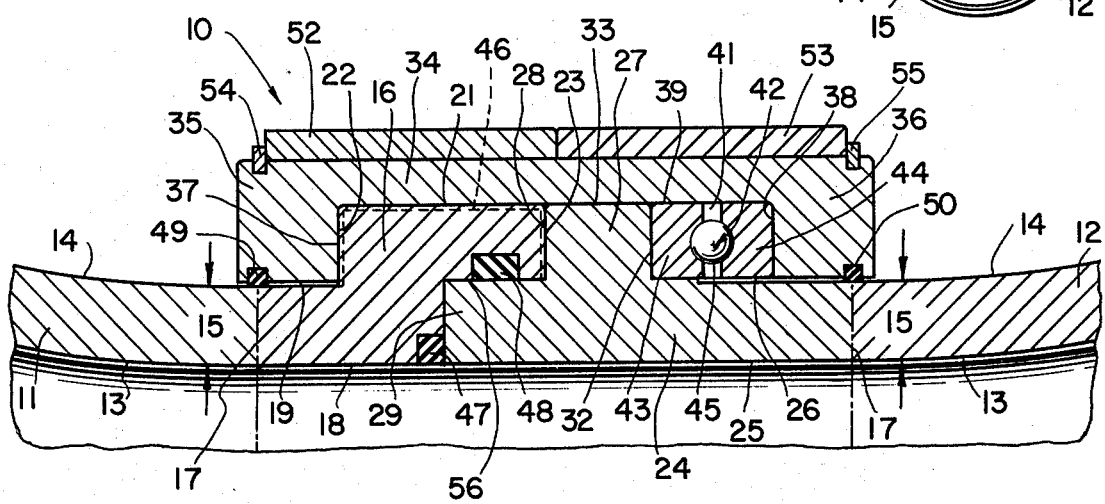
FIG. 3 is a sectional view showing a portion of FIG. 1 on an enlarged scale.

A tension sleeve 34, split as shown at 40 in FIG. 2, encircles the flange member 16 and the ring member 24 and is provided with a first inwardly directed lip 35 at one end and a second inwardly directed lip 36 at the other end. A radial surface 37 on the lip 35 abuts the shoulder 22 on the flange member 16. A radial surface 38 on the lip 36 cooperates with the surfaces 26, 32 and 39 to define an annular cavity or pocket 41 for the anti-friction bearing assembly 42. This assembly includes a race 43 contacting the radial shoulder 32, a race 44 contacting the radial surface 38, and a series of rolling balls 45 engaging the races. The races 43 and 44 are deliberately cracked apart, as shown at 51 in FIG. 2, into two halves for purposes of assembly, the halves mating perfectly after assembly. The balls 45 roll across the cracks 51 and act in compression, not in shear.

The circumferential bands 52 and 53 are not split but are each formed as continuous rings. They are installed over the split halves of the tension sleeve 34 to hold them together. The bands 52 and 53 are assembled from opposite sides of the swivel joint and are held in place, abutting each other, by retainer rings 54 and 55. No welding is involved in joining the split halves of the tension sleeve 34 or in assembling the bands 52 and 53 into position.

Seal means are provided on the axial projection 29 on the ring member 24, and the recess 31 in the flange member 16. An excluder seal ring 47 mounted on the flange member 16 adjacent its inner periphery acts as a face seal to exclude foreign matter and thereby protect the primary seal 48. This primary seal 48 is positioned in the flange member 16 and engages the cylindrical portion 56 of the axial projection 29. A leakage path downstream from the primary seal 48 is formed by small connecting grooves 46 in the surfaces 23, 21 and 37 of the flange member 16. Leakage through this path and out through the seal ring 49 provides an indication of incipient failure of the primary seal 48. The leakage path also provides for the safe release of pressure without damage to the structure.

The seals 49 and 50 are environmental seals to exclude foreign material from the interior of the swivel joint 10.

By way of example, and not of limitation, pipes of 3¾ inch internal diameter and 5¼ inch outside diameter formed of SAE 4140 steel with a hardness of 10–15 Rockwell C are spun-welded, one to the flange member 16 and the other to the ring member 24. These two members are formed of the same steel and have the same hardness as the pipes. The welding flash is removed from the inside and outside of each weld. The pipes are then cold-formed using a heavy die with a curved cavity on one side and a grooved roller on the other side. The curved pipes with attached flange member and ring member are then heat-treated and drawn to a Rockwell C hardness of 28–33. After assembly with the other parts of the swivel joint, the pipes and swivel joint are used to carry heavy flows of abrasive material at high pressure. Sand and slurry have been pumped commercially at the rate of 45 feet per second, or about 500 tons in in 24 hours. The pipes and swivel joints are used commercially with internal pressures up to 20,000 psi, tested at 30,000 psi.

The massive amounts of abrasive material pumped through the pipes and swivel joints at such high pressure cause eroding of the inside surfaces of the steel pipes and the connecting swivel joints, but since they are of all the same hardness and wall thickness the erosion rate is substantially the same at any place along the connected assemblies. This makes it possible to check on the extent of erosion wear after a period of service by weighing pipe sections and discarding them after a predetermined weight loss.

For $H_2S$ service, the heat treatment may be modified to produce a Rockwell C hardness of 20-22. This rather low hardness of the completed assemblies improves the tolerance to $H_2S$ which adversely affects higher hardnesses of steel having a molybdenum content, such as SAE 4140 steel.

Having fully described my invention, it is to be understood that I am not to be limited to the details herein set forth that my invention is of the full scope of the appended claims.

I claim:

1. In a device for connecting two pipes for carrying abrasive material under high pressure, the two pipes having substantially the same outside diameter and wall thickness, the combination of: a flange member welded to one end of one of the pipes and having an inside diameter substantially equal to that of the pipe, a ring member welded to an end of the other pipe and having an internal diameter substantially the same as that of said flange member, said ring member having an integral annular outward-extending rib, a tension sleeve encircling said flange member, ring member and rib, said tension sleeve having at one end a first inwardly directed lip engaging a shoulder on said flange member, said tension sleeve having at the other end a second inwardly directed lip encircling a portion of said ring member, said second lip and said rib defining an annular pocket between said tension sleeve and said ring member, an anti-friction bearing assembly in said annular pocket and containing roller elements acting only in compression, said tension sleeve comprising two semi-circular halves, and at least one continuous circumferential band encircling the tension sleeve to hold the two halves thereof against radial separation.

2. In a device for connecting two pipes for carrying abrasive material under high pressure, the two pipes having substantially the same outside diameter and wall thickness, the combination of: a flange member welded to one end of one of the pipes and having an inside diameter substantially equal to that of the pipe, a ring member welded to an end of the other pipe and having an internal diameter substantially the same as that of said flange member, said ring member having an integral annular outward-extending rib, a tension sleeve encircling said flange member, ring member and rib, said tension sleeve having at one end a first inwardly directed lip engaging a shoulder on said flange member, said tension sleeve having at the other end a second inwardly directed lip encircling a portion of said ring member, said second lip and said rib defining an annular pocket between said tension sleeve and said ring member, an anti-friction bearing assembly in said annular pocket, said assembly including a race engaging said annular rib and another race engaging said second lip, said races being cracked apart for purposes of assembly, anti-friction rolling elements positioned between said races, and containing roller elements acting only in compression to roll over the cracks, said tension sleeve comprising two semi-circular halves, and at least one continuous circumferential band encircling the tension sleeve to hold the two halves thereof against radial separation.

3. In a swivel joint for connecting pipes carrying abrasive material under high pressure, the combination of: two pipes of the same cross section size, at least one being curved, and being bent from a straight pipe to produce substantially uniform wall thickness in the curved pipe, the second pipe having the same wall thickness, a flange member welded to one end of one of the pipes and having an inside diameter substantially equal to the pipe to which it is welded, a ring member welded to an end of the other pipe and having an internal diameter substantially the same as that of said flange member and each of said pipes, said ring member having an integral annular outward-extending rib, a tension sleeve encircling said flange member, ring member and rib, said tension sleeve having at one end a first inwardly directed lip engaging a shoulder on said flange member, said tension sleeve having at the other end a second inwardly directed lip, said second lip and said rib defining an annular pocket between said tension sleeve and said ring member, an anti-friction bearing assembly in said pocket, an axial projection on the ring member extending into a recess in said flange member, seal means between said projection and said recess, said tension sleeve comprising two semi-circular halves, and at least one continuous circumferential band encircling the tension sleeve to hold the two halves thereof against radial separation.

4. The combination set forth in claim 3 in which said seal means includes a face seal between said projection and said flange member adjacent their inner diameters to exclude foreign matter, said seal means also including a main seal in the flange member contacting a cylindrical surface of said projection.

5. The combination set forth in claim 3 in which the flange member is provided with a leakage path downstream from said seal means to provide an indication of incipient seal failure.

6. In a swivel joint for connecting pipes carrying abrasive material under high pressure, the combination of: two curved pipes of the same cross section size and each being bent from a straight pipe to produce substantially uniform wall thickness in the curved pipe, a flange member welded to one end of one of the pipes and having an inside diameter substantially equal to the pipe to which it is welded, a ring member welded to an end of the other pipe and having an internal diameter substantially the same as that of said flange member and each of said pipes, said ring member having an integral annular outward-extending rib, a tension sleeve encircling said flange member, ring member and rib, said tension sleeve having at one end a first inwardly directed lip engaging a shoulder on said flange member, said tension sleeve having at the other end a second inwardly directed lip, said second lip and said rib defining an annular pocket between said tension sleeve and said ring member, an anti-friction bearing assembly in said pocket and containing ball elements acting only to absorb axial thrust, said tension sleeve comprising two semi-circular halves, and two continuous circumferential bands encircling the tension sleeve to hold the two halves thereof against radial separation.

* * * * *